(12) United States Patent
Ku et al.

(10) Patent No.: US 9,369,646 B2
(45) Date of Patent: Jun. 14, 2016

(54) SENSOR DARK PIXEL OFFSET ESTIMATION

(71) Applicant: Skybox Imaging, Inc., Mountain View, CA (US)

(72) Inventors: Chwen-Yuan Ku, San Jose, CA (US); H. Keith Nishihara, Los Altos, CA (US); M. Dirk Robinson, Menlo Park, CA (US)

(73) Assignee: Skybox Imaging, Inc., Mountain View, CA (US)

( * ) Notice: Subject to any disclaimer, the term of this patent is extended or adjusted under 35 U.S.C. 154(b) by 0 days.

(21) Appl. No.: 14/754,005

(22) Filed: Jun. 29, 2015

(65) Prior Publication Data

US 2015/0319385 A1 Nov. 5, 2015

Related U.S. Application Data

(63) Continuation of application No. 13/681,712, filed on Nov. 20, 2012, now abandoned.

(60) Provisional application No. 61/625,322, filed on Apr. 17, 2012.

(51) Int. Cl.
*H04N 5/361* (2011.01)
(52) U.S. Cl.
CPC ..................... *H04N 5/361* (2013.01)
(58) Field of Classification Search
CPC ..................................................... H04N 5/361
See application file for complete search history.

(56) References Cited

U.S. PATENT DOCUMENTS

| 7,796,153 | B1 | 9/2010 | Sanderson et al. |
| 7,832,928 | B2 | 11/2010 | Topfer et al. |
| 2004/0183928 | A1 | 9/2004 | Tay |
| 2005/0083419 | A1 | 4/2005 | Honda et al. |
| 2006/0209358 | A1 | 9/2006 | Rogalski et al. |
| 2006/0256215 | A1 | 11/2006 | Zhang et al. |
| 2010/0020933 | A1 | 1/2010 | Topfer et al. |
| 2010/0309341 | A1 | 12/2010 | Liu et al. |

FOREIGN PATENT DOCUMENTS

WO  WO 2013/0158150  10/2013

OTHER PUBLICATIONS

International Search Report and Written Opinion, mailed Mar. 4, 2013—12 pages.

*Primary Examiner* — James Hannett
(74) *Attorney, Agent, or Firm* — Dority & Manning, P.A.

(57) ABSTRACT

Examples of systems and methods to provide estimates of dark current for pixels of a photosensor as a function of the temperature of the sensor and the gain applied to the photosensor are described. In various implementations, the dark current estimated for each pixel can depend at least partly on a global scale factor and a global bias that depend on temperature and gain and a temperature-independent and gain-independent offset value for each pixel. The scale, bias, and offsets may be determined from multiple dark field images taken by the sensor over a range of operating temperatures. In some cases, the scale and bias can be determined using a subset of less than all the image pixels. Scale and bias derived for a particular sensor can be used in the calibration of different sensors.

32 Claims, 13 Drawing Sheets

SENSOR DARK PIXEL OFFSET ESTIMATION

CROSS-REFERENCE TO RELATED APPLICATIONS

The present application is a continuation of U.S. application Ser. No. 13/681,712 filed Nov. 20, 2012, which claims the benefit under 35 U.S.C. §119(e) of U.S. Patent Application No. 61/625,322, filed Apr. 17, 2012. Applicants claim priority to and benefit of all such applications and incorporate all such applications herein by reference.

BACKGROUND

1. Field

The present disclosure relates generally to calibrating sensors such as, for example, photosensors, which have pixel-dependent noise or bias.

2. Description of Related Art

Photosensors can be used to detect the amount of light incident on the image sensor. Photosensors include, for example, devices such as charge-coupled devices (CCDs) in which each pixel includes a photoactive capacitor, and active pixel image sensors in which each pixel includes a light sensor and an active amplifier. The amplifier can provide a programmable or switchable gain for each pixel. Active pixel image sensors produced by complementary metal-oxide-semiconductor (CMOS) techniques are commonly known as CMOS sensors. Generally, the amount of electric current produced by a pixel of the photosensor increases with the amount of light incident on the pixel. However, even when no light is incident on the pixel, a small amount of electric current, commonly called "dark current," can flow from the pixel. When an image is taken with a photosensor, dark current can act as a source of noise in the resulting image. Dark current noise can be reduced by using dark-frame subtraction in which a dark field image, taken with little or no light incident on the sensor, is subtracted from the image to at least partially compensate for the noise produced by the dark current.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

SUMMARY

Figure 1A:
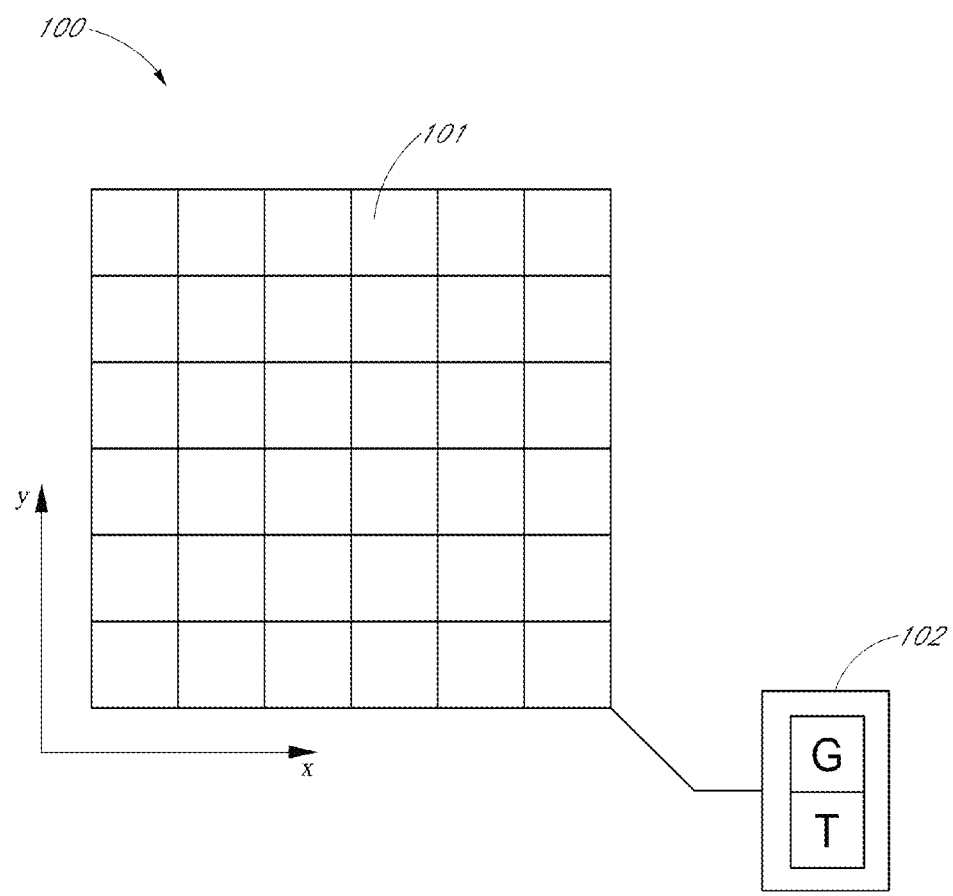
FIG. 1A schematically illustrates an example of a two-dimensional photosensor that includes electronics to apply a gain G to the sensor and to measure (and/or control) the temperature T of the sensor.

Dark current can depend, among other factors, on the temperature of the sensor and/or the gain applied to the photosensor. Dark current can be different for each pixel in the photosensor. Systems and methods are disclosed herein which provide estimates of the dark current for each pixel of a sensor as a function of the temperature of the photosensor and the gain (e.g., analog gain) applied to the photosensor. In some implementations, the dark current estimated for each pixel can depend at least partly on: (1) a global scale factor that depends on temperature and analog gain, (2) a global bias that depends on temperature and analog gain, and (3) a temperature-independent and gain-independent offset value for each pixel. In some such implementations, the scale, bias, and offsets can be determined from multiple dark field images taken by the sensor over a range of operating temperatures. In some cases, the scale and bias can be determined using a subset of less than all the image pixels. A nonlinear solver is used to perform this determination in some embodiments. Scale and bias for a particular photosensor can be similar for different photosensors of the same type or class. Since determining scale and bias factors for a particular photosensor can in some cases be computationally demanding, the scale and bias factors determined for a particular photosensor can be used in the calibration of other photosensors of the same type or class, thereby allowing efficient calibration of a large number of photosensors.

In certain embodiments described herein, two global factors (scale and bias) and one offset factor are utilized. However, this is not a limitation, and in other embodiments, the number of global factors and/or the number of offset factors (e.g., local factors for each pixel) can be one, two, three, or more. Thus, in various implementations, the calibration is factored into local and global components to improve calibration performance for a given resource allocation (e.g., memory used to store the global and local factors). In various such implementations, optimization techniques can be used to obtain the factorization into local and global components. Embodiments of the systems and methods described herein can access the global and/or local factor(s) from a memory that stores the factor(s) as data structures (e.g., LUTs, databases, etc.), mathematical functions (e.g., splines, polynomials, etc.), and so forth.

An implementation of a method for correcting for dark current in a photosensor comprising a plurality of pixels is provided. The method is performed under control of one or more physical computing devices configured with specific computer-executable instructions. The method comprises accessing a scale factor and a bias factor for the plurality of pixels of the photosensor. The scale factor and the bias factor depend at least partly on a temperature of the photosensor and a gain of the photosensor. The scale factor has the same value for each pixel in the plurality of pixels, and the bias factor has the same value for each pixel in the plurality of pixels. The method further includes, for each pixel in the plurality of pixels of the photosensor, accessing a pixel value that represents a response of the pixel to receipt of light, accessing an offset value for the pixel, where the offset value does not depend on the temperature or the gain of the photosensor, determining a corrected pixel value that depends at least partly on the pixel value, the scale factor, the bias factor, and the offset, and providing the corrected pixel value. The method can be performed much more computationally efficiently for large format sensor arrays than dark current correction methods in which each pixel has an individual correction that depends on temperature and gain.

An example of a system for correcting for dark current in a sensor comprising a plurality of pixels is described. The system comprises physical data storage configured to store (i) a scale factor applicable to the plurality of pixels, (ii) a bias factor applicable to the plurality of pixels, and (iii) an offset value for each pixel in the plurality of pixels. The scale factor and the bias factor depend at least partly on a temperature of the sensor and a gain of the sensor, and the offset value does not depend on the temperature or the gain of the sensor. The system also comprises a physical computer processor in communication with the physical data storage. The physical computer processor is configured to access the scale factor and the bias factor, access a pixel value representing an output of a pixel in the plurality of pixels, access the offset value for the pixel in the plurality of pixels, and determine a corrected pixel value for the pixel, wherein the corrected pixel value depends at least partly on the pixel value, the scale factor, the bias factor, and the offset value. The system can perform the calibration much more computationally efficiently for large format sensor arrays than dark current correction techniques in which each pixel has an individual correction that depends on temperature and gain.

In some implementations, a sensor system can comprise the example system for correcting for dark current and the sensor. The sensor system can also comprise a temperature sensor configured to measure the temperature of the sensor. In an imaging system implementation, the sensor can be a photosensor.

An implementation of a method for estimating dark current in a sensor comprising a plurality of pixels is disclosed. The method can be performed under control of one or more computing devices configured with specific computer-executable instructions. The method includes accessing a dark current value for each of the plurality of pixels in the sensor, fitting the dark current values for the plurality of pixels to a dark current model, and providing the scale factor, the bias factor, and the offset. The dark current model is based at least partly on a scale factor, a bias factor, and an offset. The scale factor and the bias factor depend at least partly on a temperature of the sensor. The scale factor has a first same value for all the pixels in the plurality of pixels, and the bias factor has a second same value for all the pixels in the plurality of pixels. The offset is independent of the temperature of the sensor, and the offset has values that can be different for different pixels in the plurality of pixels.

An implementation of a system for estimating dark current in a sensor comprising a plurality of pixels is disclosed. The system comprises physical data storage configured to store a dark current value for each of the plurality of pixels in the sensor, and a physical computer processor in communication with the physical data storage. The physical computer processor is configured to fit the dark current values for the plurality of pixels to a dark current model and to output the dark current model to the physical data storage. The dark current model is based at least partly on a scale factor, a bias factor, and an offset. The scale factor and the bias factor depend at least partly on a temperature of the sensor, with the scale factor having a first same value for all the pixels in the plurality of pixels, and the bias factor having a second same value for all the pixels in the plurality of pixels. The offset is independent of the temperature of the sensor, and the offset has values that can be different for different pixels in the plurality of pixels.

An implementation of a method for calibrating a plurality of pixels on a sensor is provided. The method is performed under control of one or more physical computing devices configured with specific computer-executable instructions. The method comprises accessing a global factor that is the same for each of the plurality of pixels, accessing a local factor for each of the plurality of pixels, the local factor capable of having values that are different for different pixels in the plurality of pixels, accessing a pixel value for a pixel in the plurality of pixels, and determining a corrected pixel value for the pixel, wherein the corrected pixel value depends at least partly on the pixel value, the global factor, and the local factor for the pixel. The method can provide the corrected pixel value.

Another aspect of the disclosure includes a method for determining dark current in a second sensor based at least in part on a dark current model for a first sensor that is different from the second sensor. The dark current model for the first sensor comprises a scale factor and a bias factor. The scale factor and the bias factor depend at least partly on temperature, and the scale factor and the bias factor each have a respective global value for all the pixels in the first sensor. The method comprises accessing the scale factor and the bias factor for the first sensor, accessing dark current values for pixels of the second sensor, determining, by execution of instructions by a physical computer processor, offset values for each of the pixels of the second sensor, and providing a dark current model for the second sensor based at least partly on the offset values for each of the pixels of the second sensor and the scale factor and the bias factor for the first sensor. The offset values are based at least in part on the dark current values for the second sensor and the scale factor and the bias factor for the first sensor.

Additionally or alternatively to calibrating for dark current, embodiments of the systems and methods described herein can be used to calibrate for effects including number of photons collected by the pixel, temperature of the pixels or sensor, gain settings, and physical or manufacturing variations. Further, the systems and methods disclosed herein are not limited to use with photosensors and can be applied to calibrations of other types of sensors that have pixel-dependent noise or bias.

DETAILED DESCRIPTION

Overview

As discussed, dark current can depend, among other factors, on the temperature of the sensor (and/or the gain applied to the sensor). Some implementations of an imaging device may include a temperature controller configured to adjust or control the temperature of the sensor. Because the sensor is kept at a controlled temperature, the dark current need not be corrected for variations in temperature of the sensor. However, temperature controllers often use significant amounts of power, and thus may not be used in certain implementations such as low-power implementations, satellite implementations, and so forth. In some of these implementations, the temperature of the sensor may vary during operation, and it may be desirable to correct for temperature-dependent effects of the dark current. Thus, a temperature sensor can be used to measure the temperature of the sensor. The disclosure herein provides examples of systems and methods for correcting for temperature-dependent effects of the dark current based on a measured or inferred temperature of the sensor. As will be further described herein, these methods can also be used to correct for gain-dependent effects of the dark current.

Embodiments of the systems and methods disclosed herein may be advantageously used for sensors that operate in low-power conditions or in space (e.g., satellites or micro-satellites), or in applications where a sensor temperature-controller is not used. For example, embodiments of the systems and methods can be used for sensors incorporated in mobile telephones, portable or desktop computers or tablets, etc.

Example Systems and Methods for Correcting Raw Pixel Values

The following illustrative examples will be described in the context of a photosensor. As used herein, photosensor is a broad term and is to be given its ordinary and customary meaning to a person of ordinary skill in the art (e.g., it is not to be limited to a special or customized meaning). Photosensors include, but are not limited to, image sensors, light sensors, optical sensors, active pixel sensors, charge-coupled devices, photodetectors, photodiodes, photoresistors, photoelectric devices, or other optoelectronic devices. Photosensors can be configured to be sensitive to visible light (e.g., having wavelengths in a range from about 400 nm to about 800 nm) and/or non-visible light (e.g., having wavelengths outside the visible range, such as X-ray, ultraviolet, or infrared wavelengths). In some implementations, a photosensor can be sensitive to a panchromatic range of wavelengths such as, e.g., visible wavelengths and near-infrared wavelengths.

The photosensor can include an array of pixels. Individual pixels in the array can be identified by an x index and y index. Each index can run from 1 to the total number of pixels in the x or y direction of the array. For example, for a square array of pixels, the x and y indices can run from 1 to N, where N is the number of pixels in each direction of the pixel array. In some cases, N can be in the range from 10 to 1000 or greater. For example, a sensor can be configured as an 80×80 array of pixels. Other pixel arrangements are possible. For example, the sensor can be a rectangular two-dimensional array of N×M pixels (e.g., a non-square array with N≠M). As another example, the sensor can be a one-dimensional array of pixels, which may be referred to as an N×1 array.

Each pixel (at location x, y in the sensor array) can output a value (typically a voltage or a current) that can depend on factors such as, e.g., sensor temperature T and sensor gain G. FIG. 1A schematically illustrates an example of a two-dimensional sensor 100 having an array of pixels (e.g., pixel 101). The sensor 100 can include electronics 102 to apply the gain G to the sensor 100 and to measure (and/or control) the temperature T of the sensor 100.

In response to receiving incident light, each pixel of the sensor can output a pixel value that is generally proportional to the amount of incident light received by the pixel. The raw pixel value also includes noise sources including dark current. In the following illustrative model, the raw pixel value from the sensor pixel at position (x,y) in the sensor array will be denoted by raw(x,y,G,T), and the pixel value corrected for dark current will be denoted by p(x,y,G,T). To correct each raw pixel value for sensor temperature T and gain G, a pixel-dependent correction c(x,y,G,T) can be applied to the raw pixel output raw(x,y,G,T) (e.g., by subtracting the correction c(x,y,G,T) from the raw pixel value raw(x,y,G,T) to determine the corrected pixel value p(x,y,G,T), e.g., p(x,y,G,T)=raw(x,y,G,T)−c(x,y,G,T)). However, some such methods can consume a significant amount of memory in the processing system that performs the correction. For example, if the gain is discretized over $G_{dim}$ gain values, and the temperature is discretized over $T_{dim}$ temperature values, the number of independent values for the pixel-dependent correction c(x,y,G,T) for an N×N sensor can be $N^2*G_{dim}*T_{dim}$, which can be quite large for large format sensor arrays.

Accordingly, in some implementations, the pixel-dependent correction can be modeled as (1) a global scale factor, (2) a global bias that depends on temperature and gain, and (3) a temperature-independent and gain-independent offset value for each pixel. In some such implementations, the global scale factor and the global bias can depend on gain and temperature and will be denoted by scale(G,T) and bias(G,T), respectively. The offset value for each pixel will be denoted by offset(x,y). In some such implementations, the correction factor can be written as $$c(x,y,G,T)=\text{scale}(G,T)\text{offset}(x,y)+\text{bias}(G,T). \qquad (1)$$

In this example correction model, the number of independent values for the correction factor can be $N^2+2*G_{dim}*T_{dim}$. For implementations in which multiple gain factors and temperatures are corrected for (e.g., the product $G_{dim}*T_{dim}$ is much larger than one), the correction factor given by Equation (1) typically uses much less computer storage than the aforementioned correction factor in which each pixel can have independent gain and temperature dependent corrections. Accordingly, various implementations using the correction factor of Equation (1) may use less computer storage and processor time, which advantageously may increase processing speed and efficiency.

An individual pixel value can be determined using Equation (1) as:

$$p(x,y,G,T)=\text{raw}(x,y,G,T)-(\text{scale}(G,T)\text{offset}(x,y)+\text{bias}(G,T)), \qquad (2)$$

where raw(x,y,G,T) denotes the raw pixel value measured at sensor temperature T and gains G. In some cases, the raw pixel value may be reset-corrected prior to applying Equation (2) (e.g., to correct for charge accumulated in a prior image). In other cases, the raw pixel value may include other system or electronics corrections prior to being dark-current corrected using Equation (2).

In some implementations, an image processing system comprising computer storage and a hardware processor can access the raw pixel values (e.g., directly from the photosensor or from a stored image) and apply the corrections using Equation (2). The scale and bias factors can be stored as lookup tables (LUTs) (or other suitable data structures) indexed by gain and temperature. Interpolation or extrapolation methods can be used for values of gain or temperatures that do not fall precisely on an indexed gain or temperature value, respectively. In some cases, the scale and bias factors may be fit as one or more mathematical functions of G and T, for example, as polynomials, splines, etc. In various embodiments, the offset can be stored as a two-dimensional LUT or fit as one or more mathematical functions of index values x and y (e.g., splines, polynomials, etc.). Accordingly, in certain such implementations, the systems and methods may determine or evaluate an LUT or fitting function for one or more of the scale factor, bias factor, and/or the offset factors. In various embodiments, each pixel can be processed serially or a group of some or all of the pixels can be processed in parallel fashion.

In some example implementations, in addition to depending on temperature and/or gain, the scale and/or bias factors may have values that are different for different groups of pixels in the sensor. For example, scale and/or bias factors may be determined for groups of pixels that are identified as having similar gain and/or temperature dependency. As another example, scale and/or bias factors can be determined for different physical regions of the sensor (e.g., scale factors and/or bias factors can be determined for each of the four quadrants of the sensor). Thus, in some such implementations, there may be a plurality of scale and/or bias factors that are applied to different groups of pixels in the sensor. As an example, if the sensor includes $K_{dim}$ different groups of pixels, the plurality of scale and/or bias factors may be written as $\text{scale}_k(G,T)$ and $\text{bias}_k(G,T)$, where $k=1, \ldots, K_{dim}$ indexes the different groups of pixels. The correction factor can be written as:

$$c(x,y,G,T) = \text{scale}_k(G,T)\text{offset}(x,y) + \text{bias}_k(G,T), \quad (3)$$

where the index k is selected based on which group the pixel located at (x,y) is a member of. Note that Equation (3) reduces to Equation (1) when there is one scale and bias factor for the sensor (e.g., k=1). Each of the plurality $K_{dim}$ scale and/or bias factors can be determined using the techniques described herein when applied to the particular pixels of the $K_{dim}$ different groups of pixels in the sensor.

In some implementations, there may be individual scale and/or bias factors for each pixel of the sensor such that these factors can be alternatively be written as scale(G,T) and/or bias(x,y,G,T) (e.g., $K_{dim}=N^2$ in this example). The number of scale and/or bias factors selected for use with a particular sensor may depend at least partly on considerations including processing power and/or memory size of the imaging system electronics. For example, increased processing power and/or memory size may permit use of an increased value for $K_{dim}$. Use of larger values of $K_{dim}$ may in some cases provide a more accurate correction factor c(x,y,G,T) for the sensor since the scale and/or bias factors can account for variations across the sensor. Accordingly, in some such cases, a further consideration for selecting the number of scale and/or bias factors may be a tradeoff between accuracy (e.g., use of larger $K_{dim}$) and image processing speed (e.g., use of smaller $K_{dim}$).

Figure 1B:
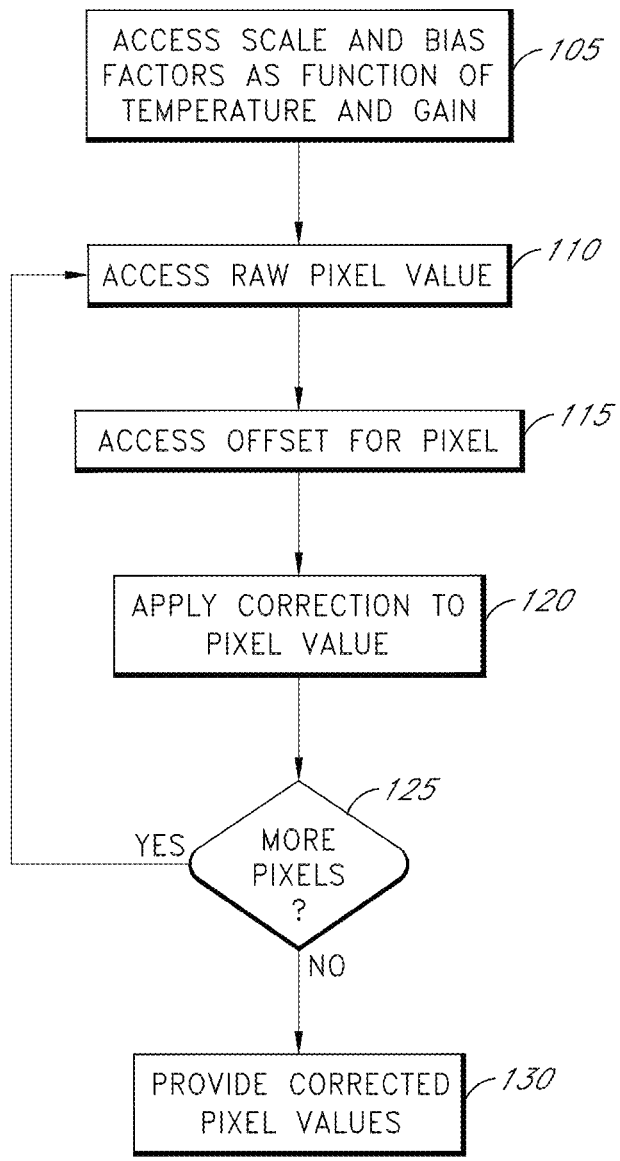
FIG. 1B is a flowchart that illustrates an example method for processing an image or output from a photosensor using an implementation of a correction model described herein.

FIG. 1B is a flowchart that illustrates an example method for processing an image or output from a sensor using an implementation of the correction model described with reference to Equations (1) and (2). The example method can be implemented by the image processing system. At block 105, the method accesses the scale and bias factors, scale(G,T) and bias(G,T), for the gain and temperature of the sensor. At block 110, the method accesses a raw pixel value raw(x,y, G, T) for a pixel at location x and y on the sensor. The sensor can include (or be coupled with) a temperature sensor that determines the temperature T, and the sensor electronics can output the gain G applied to the sensor. At block 115, the method accesses the offset value offset(x,y) for the location x and y on the sensor. At block 120, the corrected pixel value p(x,y,G,T) is calculated using, for example, Equation (2). At block 125, if there are additional pixels to process, the method returns to block 110. If there are no additional pixels to process, the method continues at block 130 and provides the corrected pixel values p(x,y,G,T), for example, by storing them in a computer-readable medium or communicating them to an electronic component or user of the image processing system. Accordingly, the example method utilizes a single offset value at each pixel together with global (e.g., one value across the pixel array) temperature and gain dependent scale and bias terms.

In other implementations, rather than correcting for both gain and temperature, only one of these parameters is corrected for by the example method of FIG. 1B. In yet other implementations, the scale and bias factors can vary across the sensor array. For example, groups of pixels (e.g., quadrants or other portions of the sensor) may be corrected with a scale and/or bias factor that is determined to apply to that particular group of pixels. Accordingly, Equations (1) or (2) may be applied to individual pixels within a portion of the sensor array such that the scale and/or bias factors are individually determined for each specific portion of the array. Many variations are possible.

Example Systems and Methods for Determining Pixel Correction Terms

Figure 2:
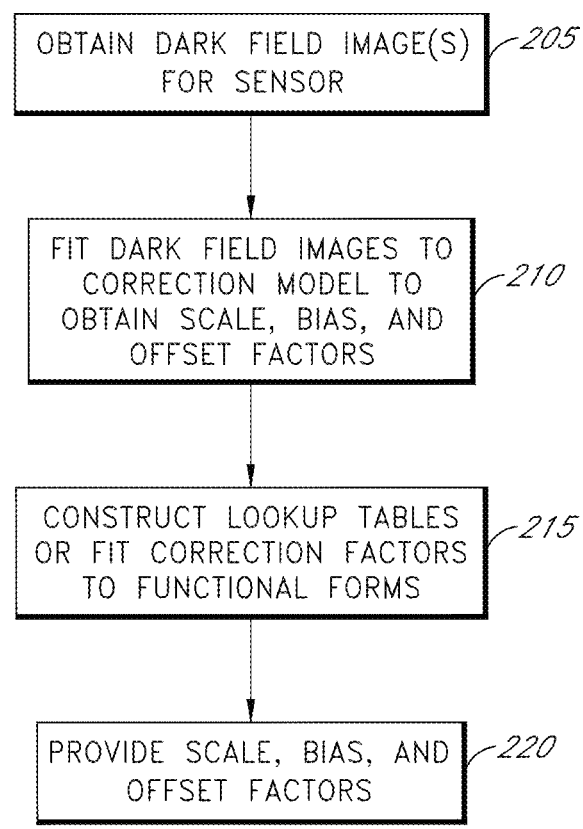
FIG. 2 is a flowchart that illustrates an example method for determining correction terms for scale, bias, and offset factors for one example implementation of the correction model.

FIG. 2 is a flowchart that illustrates an example method for determining the correction terms scale(G,T), bias(G,T), and offset(x,y). The example method can be implemented by the image processing system discussed above or by a sensor calibration system comprising non-transitory computer storage and a hardware computer processor.

At block 205, one or more dark field images are taken with the sensor. Although one dark field image can be used, multiple dark field images may provide increased signal to noise and a better estimate of the sensor dark current than a single dark field image. The raw pixel values of the dark field images can be averaged to provide an average dark current value for each pixel as a function of gain and temperature, darkav(x,y, G,T). The dark field image(s) can be obtained at one or more gain values ($G_{dim}$ values) and/or one or more temperature values ($T_{dim}$ values) over the operating ranges for gain and temperature. In some cases, the method obtains the average dark field values by accessing dark field image(s) stored on computer storage.

In some implementations, bad pixels on the sensor can be identified and not used in the calculations for the correction model parameters. For example, pixels in the averaged dark field image that exceed a given threshold can be flagged as "bad". The union of such pixels for all temperatures and gains can be used as a bad pixel mask. In some of the results described herein, the threshold was 100, which pruned approximately 0.5 percent of the pixels on the tested sensor. In other implementations, bad pixels can be identified using a collection of multiple bright field images. The pixels that deviate more than some number of standard deviations from the mean pixel value can be marked as bad.

At block 210, the average dark current values for the sensor are fit to the correction model (e.g., Eq. (1)) to determine the parameters of the correction model: scale(G,T), bias(G,T), and offset(x,y). For example, statistical regression techniques can be used to fit the correction model to the average dark current. In some implementations of block 210, an objective function is defined and numerical methods are used to reduce or minimize the objective function to determine "best-fit" values for scale(G,T), bias(G,T), and offset(x,y). For example, the "error" at each pixel can be defined as $$\text{error}(x,y,G,T) = \text{darkav}(x,y,G,T) - (\text{scale}(G,T)\text{offset}(x,y) + \text{bias}(G,T)). \quad (4)$$

The objective function may be the sum over a group of pixels in the array of the squared error: $\text{error}^2(x,y,G,T)$. In some such implementations, the objective function is reduced or minimized over smaller patches of the pixel array to determine the correction terms, and then these correction terms are averaged. For example, for certain sensors, 40 dark field images were taken at each temperature and gain. The correction terms were fit over 20×20 patches of the resulting averaged dark field image. In this case, there are 20*20+ 2*$G_{dim}$*$T_{dim}$ unknown parameters to fit. For example, if $G_{dim}$ is 2 and $T_{dim}$ is 7, there would be 428 unknown parameters. Note that this is much less than the 5600 unknown parameters that would be needed if individual correction factors for each pixel were used.

An iterative numerical solver can be used to determine these parameters. This procedure can be repeated for multiple different patches of the dark field image, and the results averaged. In some such cases, eight 20×20 patches were used on the top half of the dark field image and eight 20×20 patches were used on the bottom half of the dark field image. The results for the top half and the bottom half of the image can be averaged to provide an overall estimate for scale(G,T) and bias(G,T).

In some implementations, the averaged values for scale(G,T) and bias(G,T) can be used to solve for offset values at each pixel in the full dark image as:

$$\text{offset}(x,y) = \frac{\sum_{i,j}(\text{scale}(G_i, T_j)\text{darkav}(x, y, G_i, T_j) + \text{scale}(G_i, T_j)\text{bias}(G_i, T_j))}{\sum_{i,j}\text{scale}^2(G_i, T_j)} \quad (5)$$

where the sum is over all gains and temperatures.

In some cases, including bad sensor pixels in the determination of the scale(G,T), and bias(G,T) factors can lead to errors in these factors. Accordingly, as discussed above bad sensor pixels can be identified (e.g., via the threshold techniques) and removed from the calculations for the correction model parameters. In some such cases, a lower threshold is first used so that a relatively larger proportion of bad pixels are identified, for example, 1%, 2%, 5%, 7%, 10%, or more of the pixels. The scale(G,T) and bias(G,T) factors can then be determined from the resulting set of "good" pixels, which can reduce the errors in the determination of these factors as compared to using sensor data sets that include more bad pixels. The threshold can then be increased (e.g., to the levels described above) so that fewer bad pixels are identified (e.g., less than 0.5% or 1% of the pixels), and the offset(x,y) factor determined for this larger set of pixels. Some such methods advantageously can provide better determinations of the scale (G,T) and bias(G,T) factors, while also providing offset(x,y) values for a larger number of pixels.

Some implementations of the method at block 215 construct lookup tables and/or fit functional forms to one or more of scale(G,T), bias(G,T), and offset(x,y). At block 220, scale (G,T), bias(G,T), and offset(x,y) (or the associated LUTs or functional fits) can be provided, for example, by storing them in a computer-readable medium or communicating them to an electronic component or user of the image processing system or a sensor calibration system.

Accordingly, embodiments of the method described with reference to FIG. 2 can provide an optimized solution for pixel offsets and temperature and gain indexed global scale and biases. A non-linear solver can be used fit a correction model to multiple dark field images collected over a desired operating temperature range and a desired operating gain range. In some cases, the non-linear solver optimizes an objective function based at least partly on the squared difference between the dark field images and the correction model. The solver can be applied to a subset of the image pixels to derive the scale and bias terms. Once these are derived, the offset values of all the pixels can be determined from the scale and bias terms and the dark field image values.

Examples of Pixel Correction Terms Determined for Sensors

An implementation of the method described with reference to FIG. 2 was used to determine scale(G,T), bias(G,T), and offset(x,y) for a CMOS photosensor. Example results are described below. In these examples, the analog gain of the sensor could be 2-times (2×) or ten-times (10×). The temperature values (in degrees centigrade) included 0.8 C, 12 C, 24 C, 37 C, 48 C, 60 C, and 73 C. Thus, $G_{dim}$ is 2 and $T_{dim}$ is 7 in some of the example results below. In other example, other numbers of gains and temperature values can be used, e.g., $G_{dim}$ can be 1, 3, 4, 5, 6, or more and/or $T_{dim}$ can be 1, 2, 3, 4, 5, 6, 8, 9, 10, or more. As further discussed herein, pixel correction may be implemented for only one of gain or temperature, rather than both gain and temperature, or may be implemented for corrections of variables in addition or as an alternative to gain and/or temperature.

A. Example Fit Using All Data Samples

Figure 3:
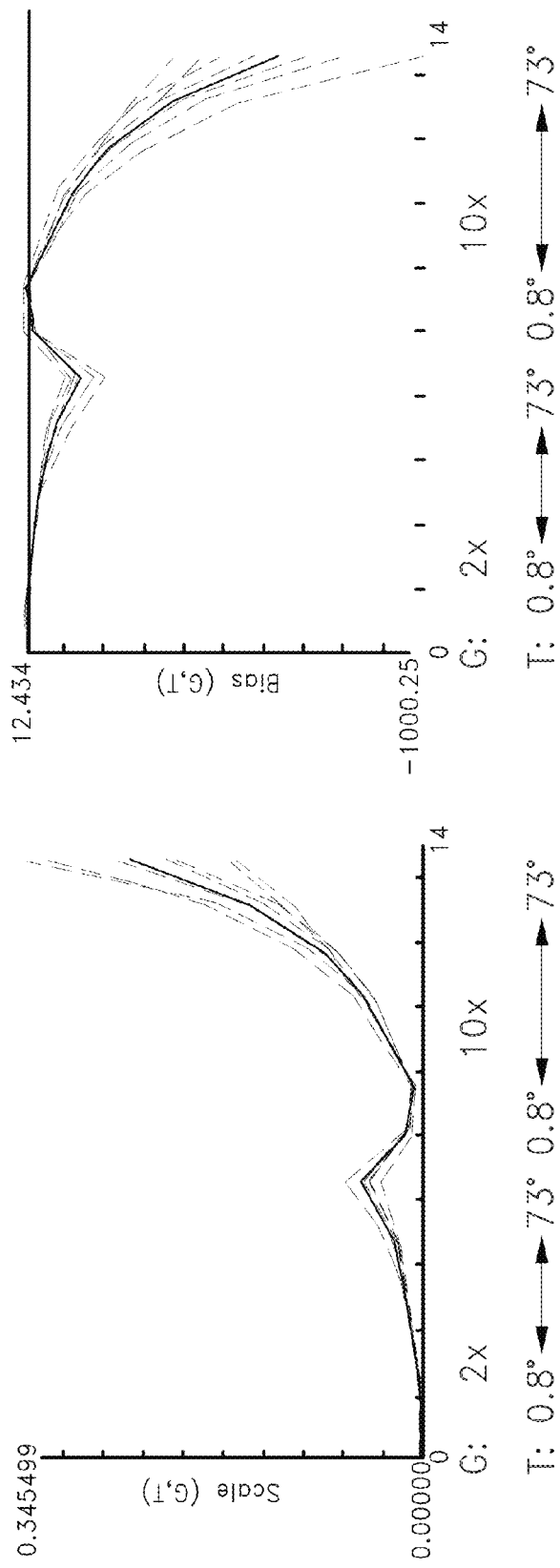
FIG. 3 includes graphs showing examples of scale factors (on the left) and bias factors (on the right) as a function of sensor gain (two times gain (2×) and ten times gain (10×)) and sensor temperature from 0.8 through 73 degrees centigrade.

In this example, a dark field bad pixel threshold of 520 was used, which resulted in about 1% of the pixels being marked bad. FIG. 3 includes graphs showing examples of scale(G,T) (on the left) and bias(G,T) (on the right). The vertical axis in each graph is scale or bias, respectively. The horizontal axis shows curves for the two gain values (2× and 10×) at each of the temperature values between 0.8 C and 73 C. The lighter dashed curves show eight solutions solved on different 20×20 pixel patches on the sensor, and the heavy solid curve shows the average of these eight solutions.

As can be seen from FIG. 3, in this example the absolute magnitude of both scale and bias increase as temperature increases. Also, for the same temperature, the absolute magnitude of both scale and bias are larger for larger gain.

Figure 4:
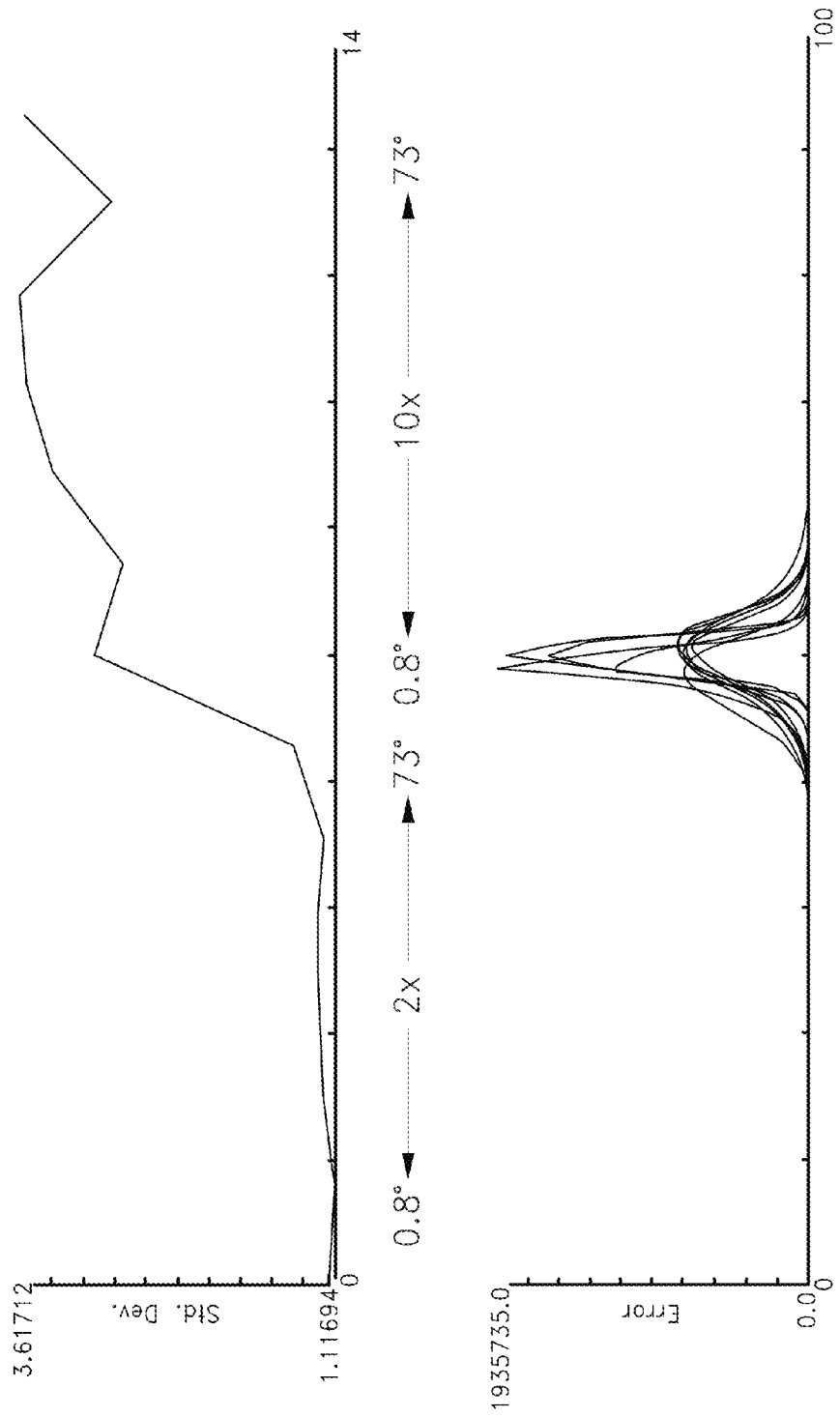
FIG. 4 shows graphs of examples of model fit error using for temperature data from 0.8 through 73 degrees centigrade. The upper graph shows an example of the standard deviation of dark field pixel fit error at each temperature and gain setting (2× and 10×). The lower graph shows fit error histograms for each temperature and gain setting.

FIG. 4 shows graphs of examples of model fit error using LUTs generated with all temperature data from 0.8 through 73 degrees centigrade. The upper graph shows the standard deviation of dark field pixel fit error at each temperature and gain setting (2× and 10×). The overall standard deviation of the dark field pixel fit error is about 2.58 in this example. The lower graph shows fit error histograms for each temperature and gain setting.

B. Example Fit Using a Subset of All Data Samples

In this example, the dark field data for a subset of the temperatures was used for determining scale(G,T), bias(G, T), and offset(x,y). In this example, data for three temperatures was used: 0.8 C, 37 C, and 73 C to determine scale(G,T), bias(G,T), and offset(x,y), and these fits were used to estimate dark offset images for the remaining temperatures (12 C, 24 C, 48 C, and 60 C). A dark field bad pixel threshold of 520 was used for this data, which resulted in 1% of the pixels being marked bad.

Figure 5:
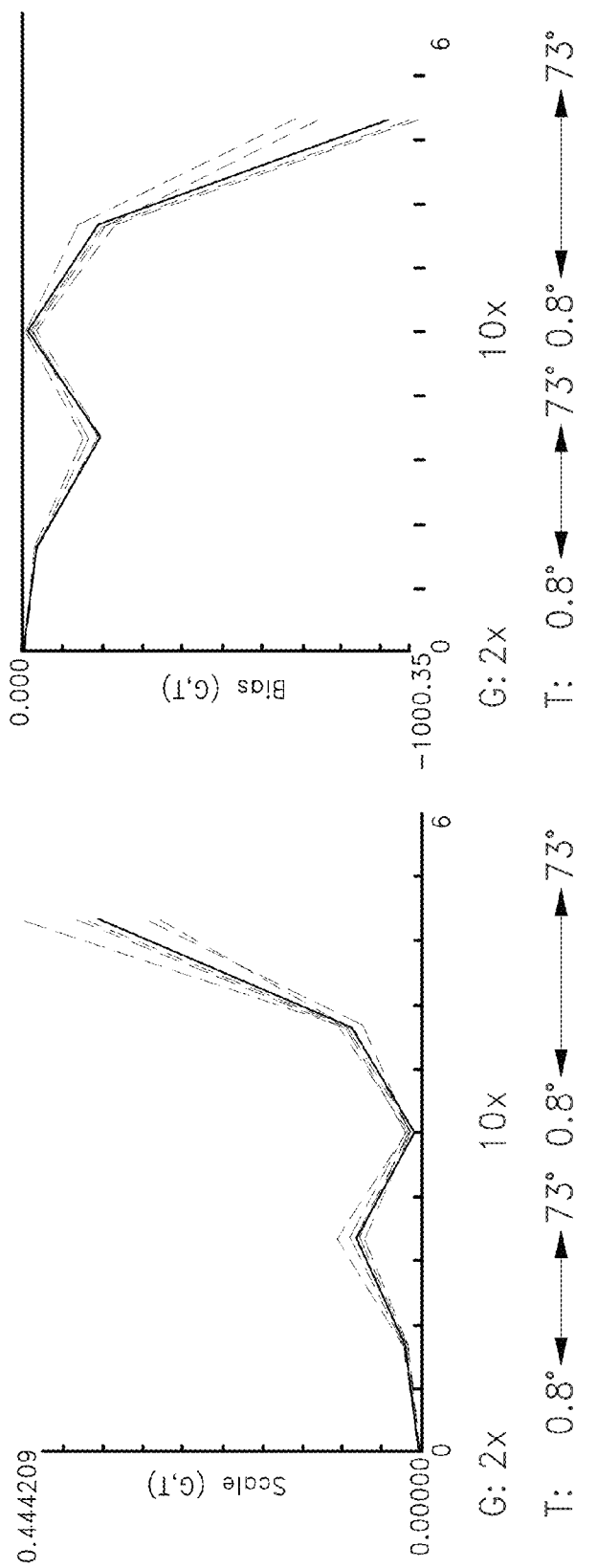
FIG. 5 includes graphs showing additional examples of scale factors (on the left) and bias factors (on the right) as a function of sensor gain (2× and 10×) and sensor temperature from 0.8 through 73 degrees centigrade.
Figure 6:
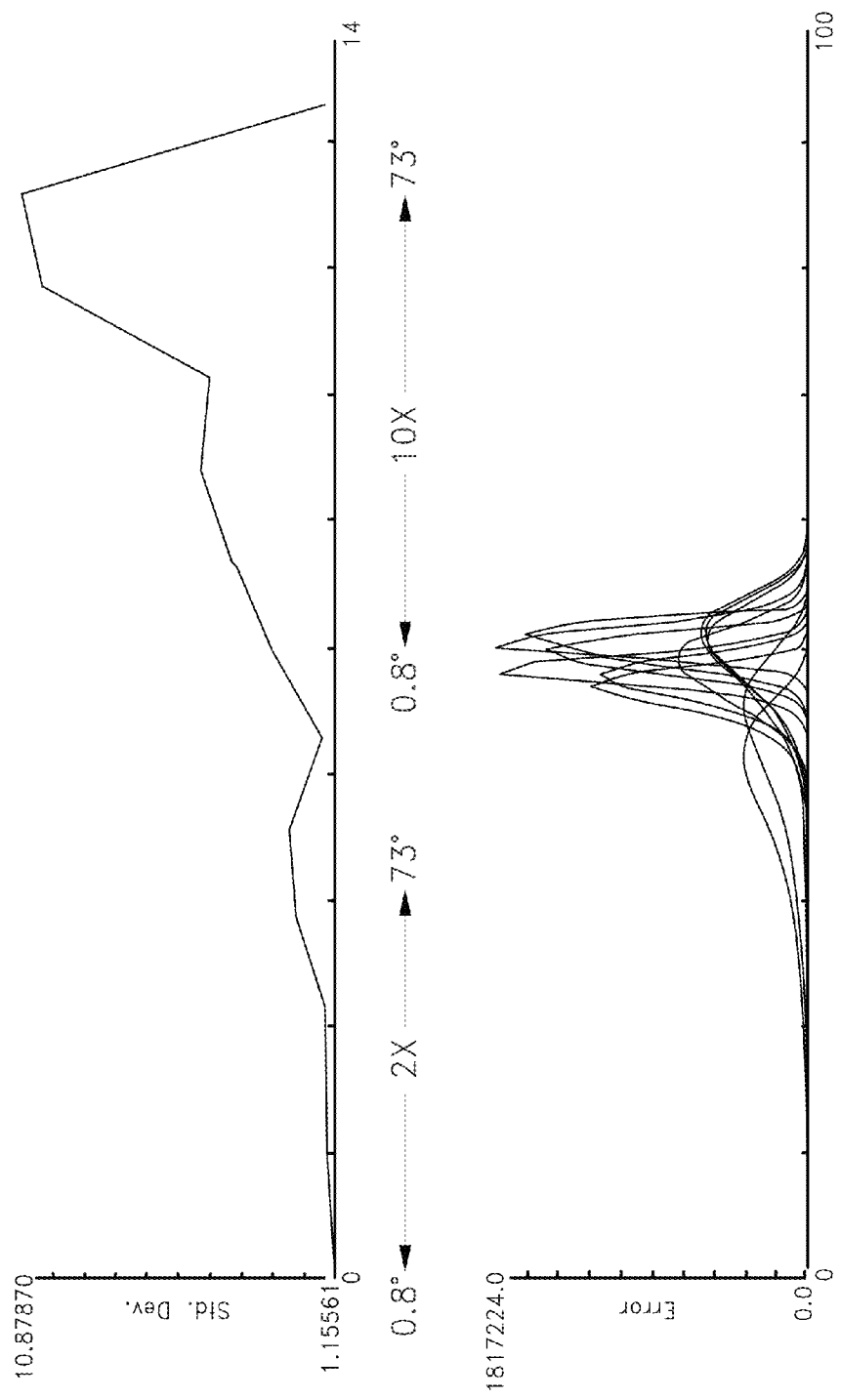
FIG. 6 shows graphs of additional examples of model fit error using for temperature data from 0.8 through 73 degrees centigrade. The upper graph shows another example of the standard deviation of dark field pixel fit error at each temperature and gain setting (2× and 10×). The lower graph shows fit error histograms for each temperature and gain setting.

FIGS. 5 and 6 show examples that are generally similar to FIGS. 3 and 4, respectively, described above, except that the gain, bias, and offsets were determined from data for three temperatures: 0.8 C, 37 C, and 73 C. The overall standard deviation of the dark field pixel fit error is about 6.30 in this example.

The example results presented in FIGS. 5 and 6 demonstrate that a subset of the temperatures in the range of operating temperatures for the device can be used to determine the correction model terms scale(G,T), bias (G,T), and offset(x, y). Likewise, it is believed that a subset of gains in the range of gains could be used to determine the correction model terms. Accordingly, certain embodiments advantageously may use only a subset of the $G_{dim}$ gains and the $T_{dim}$ temperatures to determine scale(G,T), bias (G,T), and offset(x,y).

C. Example Calibrations for Different Sensors of the Same Type

For some types of sensors, the scale and bias terms may be relatively similar in value and shape for different sensors of the same type. Accordingly, the scale and bias terms can be evaluated for one particular sensor, and then the same scale and bias terms used for other sensors of the same type. In some such implementations, only the pixel-dependent offset values would be determined for each particular sensor. The offset values can be determined using a reduced set of calibration data, for example, dark field images taken using 2× and 10× gains and at a single temperature (e.g., the high end of the operating temperature range). Further, the offset can readily be determined from Equation (5) using scale, bias, and darkav from the reduced set of calibration data.

Figure 7:
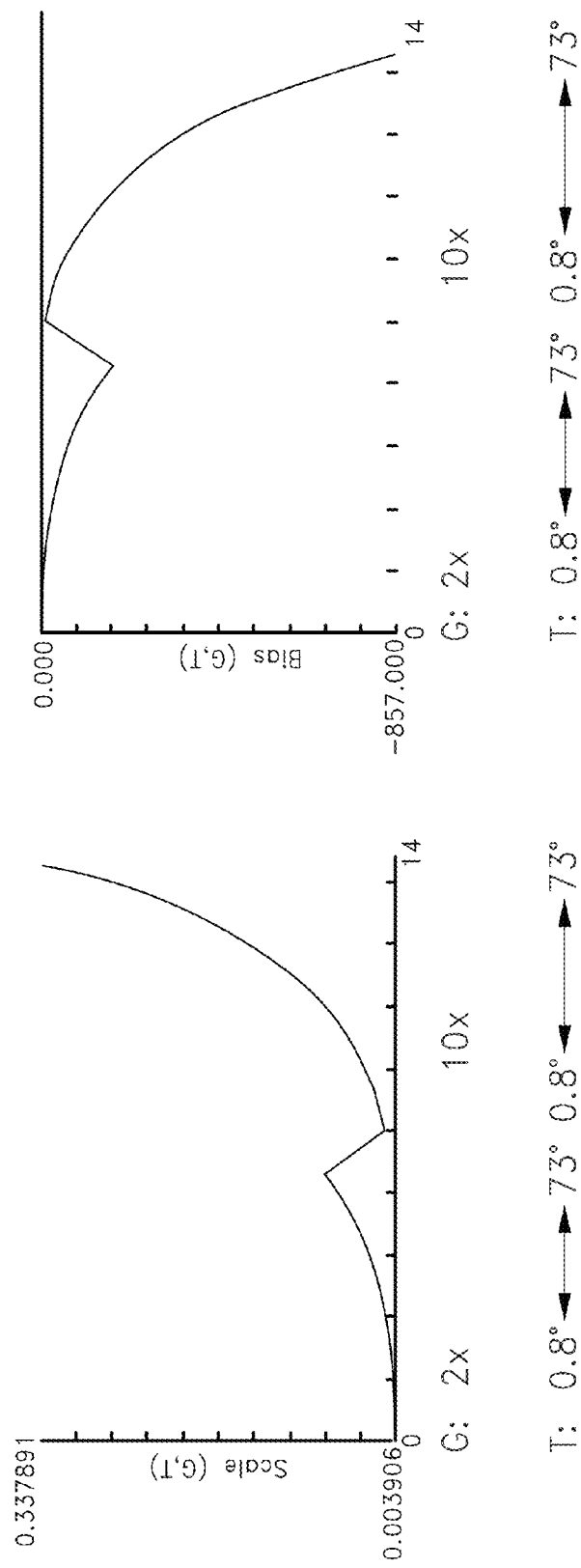
FIG. 7 includes graphs showing an additional example of a scale factor (on the left) and a bias factor (on the right) as a function of sensor gain (2× and 10×) and sensor temperature from 0.8 through 73 degrees centigrade.
Figure 8:
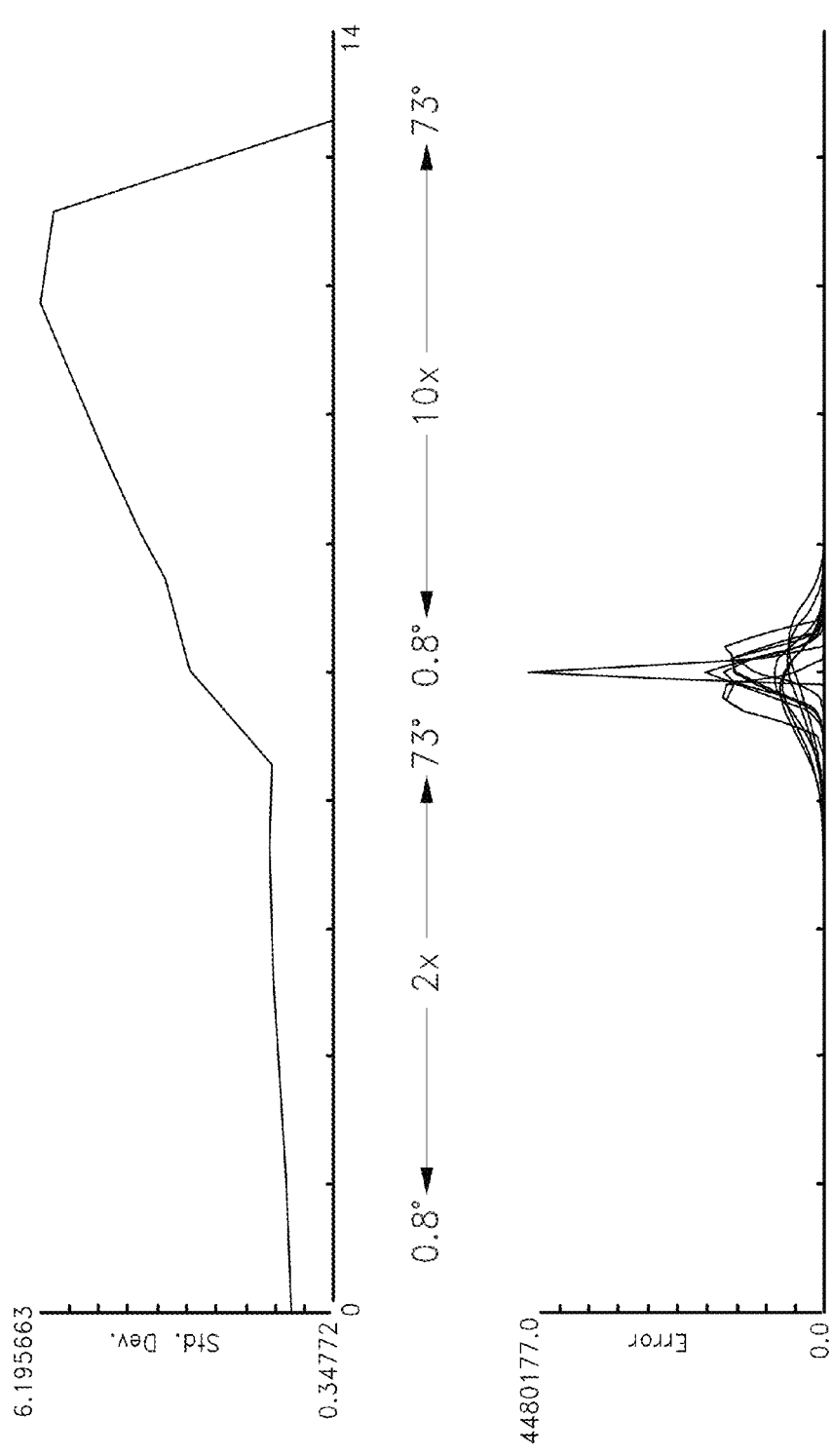
FIG. 8 shows graphs of additional examples of model fit error using for temperature data from 0.8 through 73 degrees centigrade. The upper graph shows another example of the standard deviation of dark field pixel fit error at each temperature and gain setting (2× and 10×). The lower graph shows fit error histograms for each temperature and gain setting.

In the following example, dark field image data at a temperature of 73 C was used to derive offset(x,y). FIGS. 7 and 8 show examples that are generally similar to the examples shown in FIGS. 3 and 4, respectively, described above. The results shown in FIGS. 7 and 8 are somewhat better than the example using three temperatures in Section B described above (see, e.g., FIGS. 5 and 6). For example, the overall standard deviation of the dark field pixel fit error is about 3.64 in this example, whereas the standard deviation of the fit error is about 6.30 in the three-temperature example in Section B.

Accordingly, in some implementations, the scale and bias versus temperature curves may be generally similar for different sensors of the same type, and the scale and bias curves can be reused when calibrating new sensors. While the derivation of the original scale and bias curves can be computationally demanding, embodiments of this method can use the determined scale and bias terms and Equation (5) to determine the pixel-dependent offset for new sensors. Accordingly, determination of the correction model for new sensors advantageously can be performed computationally efficiently.

D. Additional Examples of Data Results

Figure 9:
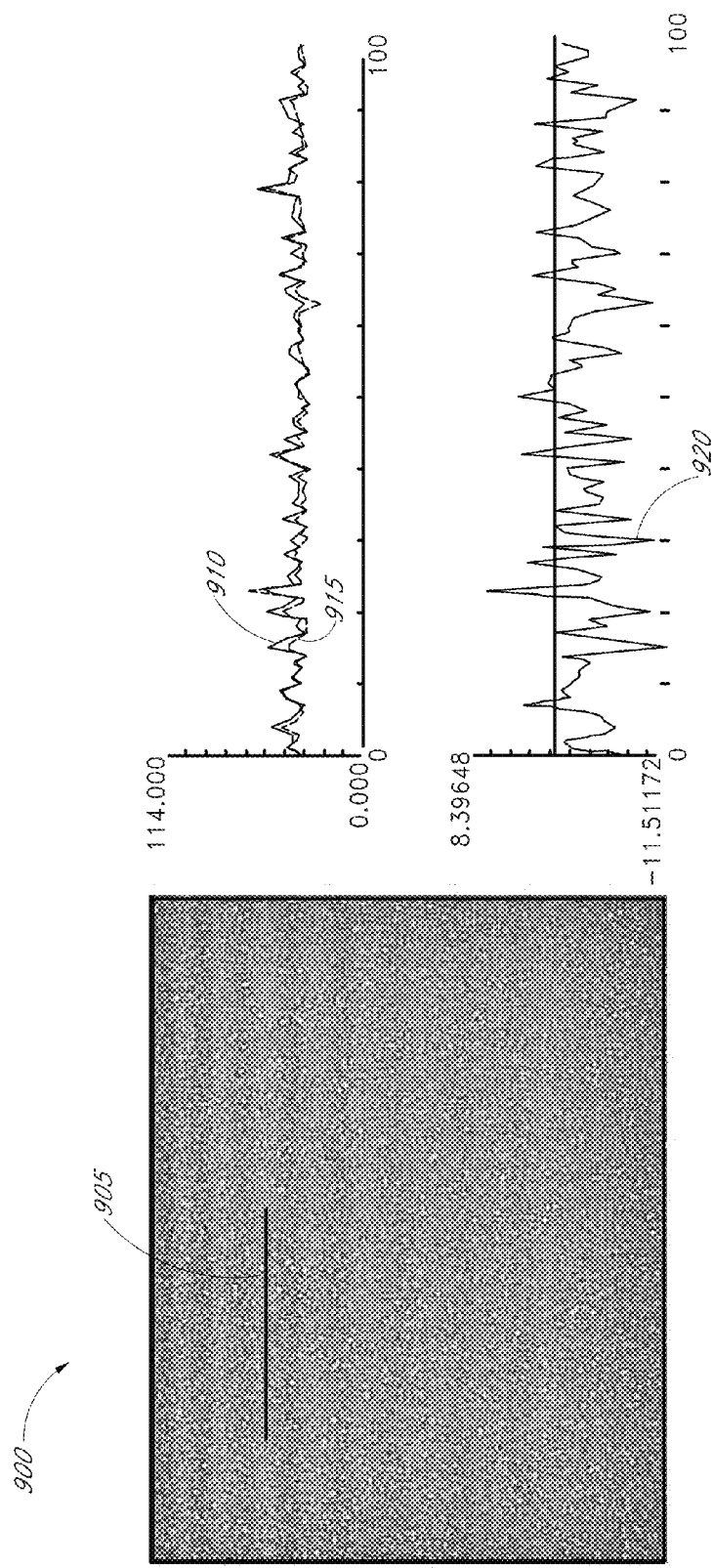
FIG. 9 shows an example of a dark image (on the left) and comparisons of pixel offset values against raw pixel values from a 100 pixel-long slice through the dark image in the graphs on the right.

FIG. 9 shows an example of a dark image 900 and comparisons of pixel offset values against raw pixel values from a 100 pixel-long slice 905 through the dark image 900 in the graphs on the right. Trace 910 shows a model estimated for the pixel dark current values using the techniques described herein, and trace 915 shows the raw pixel values along the slice 905. Trace 920 in the lower graph shows the difference between the model estimates 910 and the raw pixel values 915.

Figure 10:
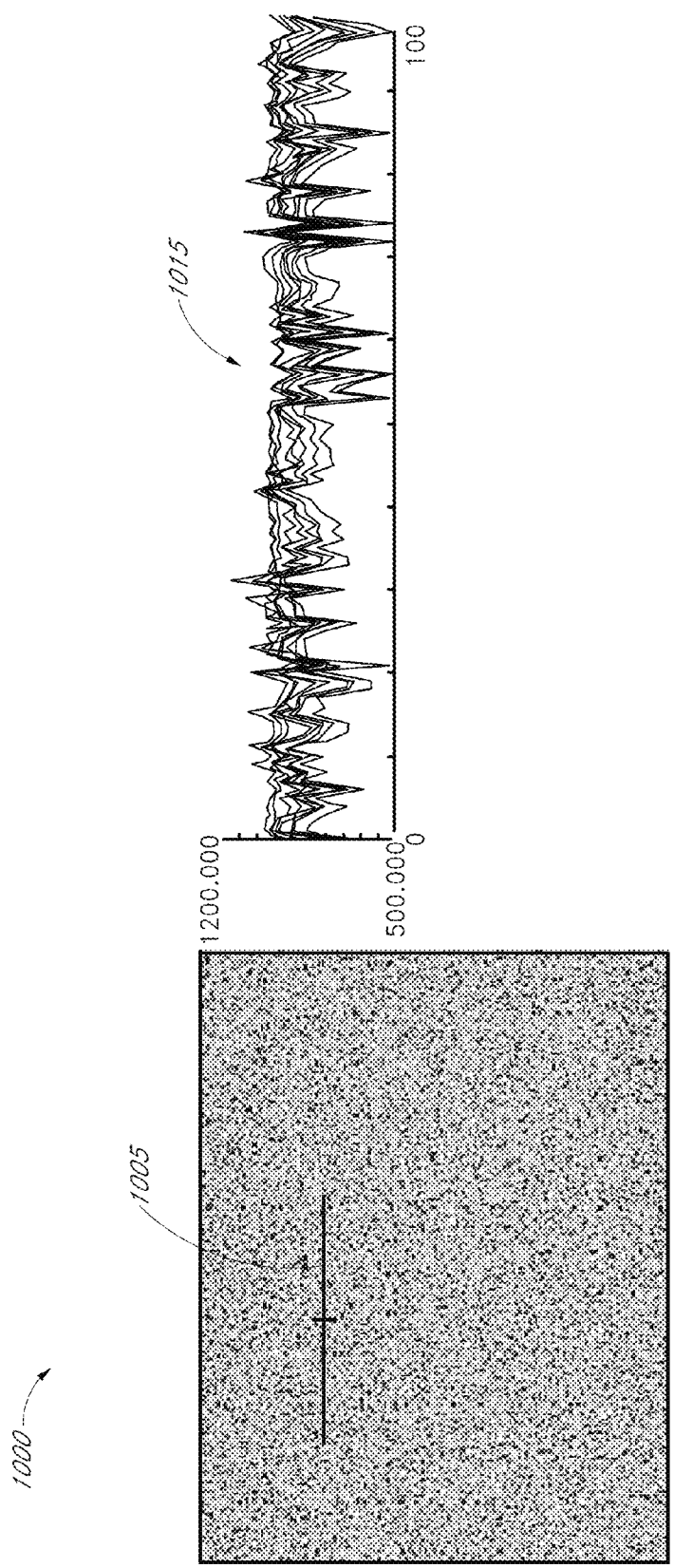
FIG. 10 shows another example of a dark image (on the left) and comparisons of pixel offset values against raw pixel values from a 100 pixel-long slice through the dark image in the graph on the right.
Figure 11:
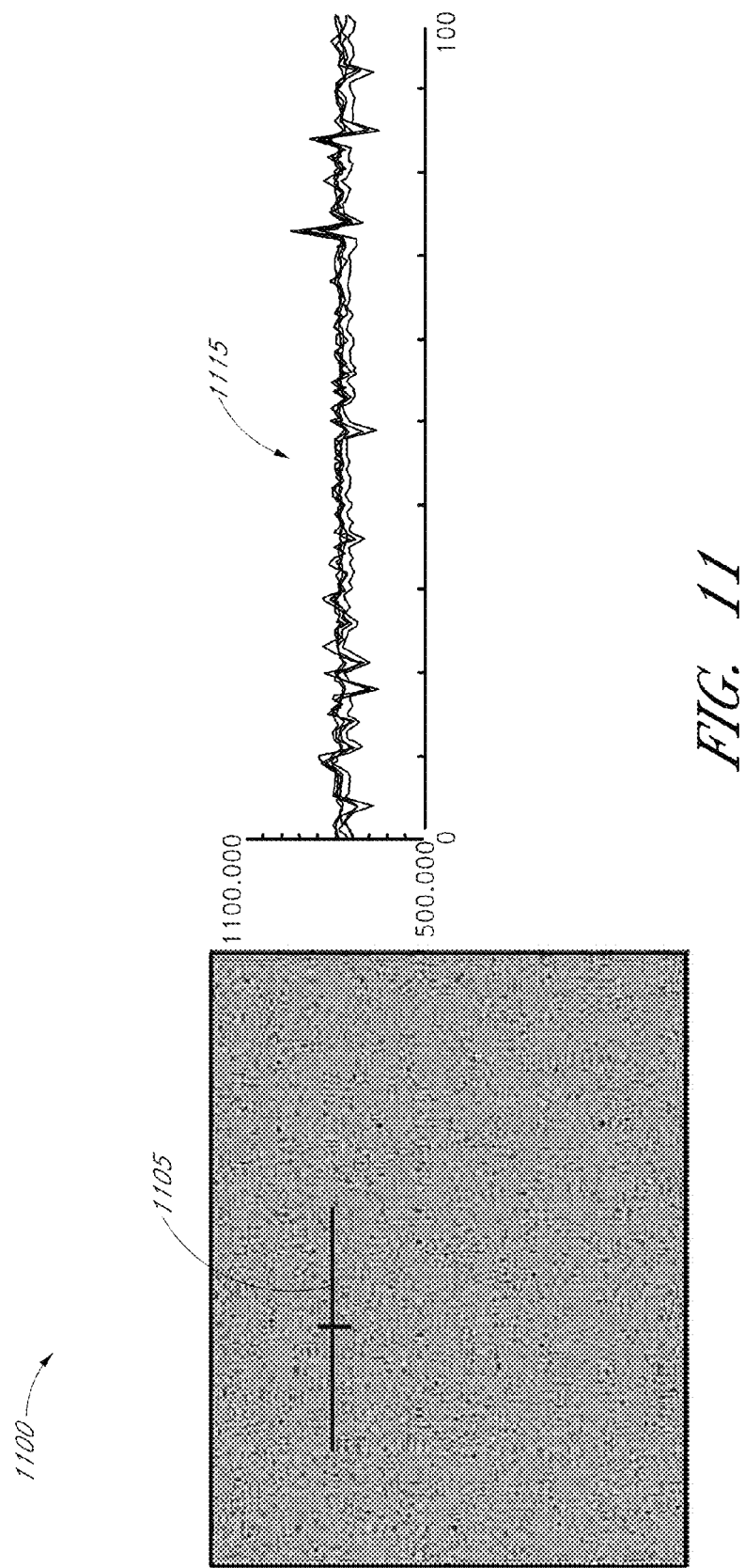
FIG. 11 shows another example of a dark image (on the left) and comparisons of pixel offset values against raw pixel values from a 100 pixel-long slice through the dark image in the graph on the right.

FIGS. 10 and 11 show example dark images 1000, 1100, respectively. The dark images 1000, 1100 include 100 pixel-long slices 1005, 1105 shown as horizontal bars in the upper half of the dark images 1000, 1100, respectively. FIGS. 10 and 11 are for two different data sets. FIGS. 10 and 11 also include graphs showing overlayed traces 1015, 1115, respectively, of data from the 100 pixel-long slices 1005, 1105, respectively, for all temperatures and gains.

E. Additional Considerations

In various sensor implementations, each pixel can have a rather complex operational behavior that may depend on one or more factors including number of photons collected by the pixel, temperature, gain settings, and physical or manufacturing variations. Accordingly, embodiments of the systems and methods described herein can be used to calibrate each pixel to produce a substantially uniform behavior across the sensor with regard to the relationship between photon collection and output signal. For example, in some embodiments, calibration can be thought of as building a model for each pixel that describes the variation among pixels in a way that allows removing the influence of those variations on the desired output. In some such embodiments, the calibration uses information stored in a computer-readable memory (e.g., scale, bias, and offset factors), and there can be a tradeoff between storing greater amounts of information (which may increase quality of the calibration) and the costs of increased memory storage for the information and/or the processing power and time needed to perform the calibration.

Therefore, to increase the quality of calibration for a given amount of calibration information storage, in certain embodiments the calibration (for at least a subset of sensor pixels) is factored into two parts: (1) one or more global calibration factors that apply to all pixels of the subset uniformly and (2) a specific calibration that applies to each pixel in the subset individually. For example, dark current correction can be performed using (1) global scale and bias functions that depend on temperature and/or gain, and (2) local offset values for each pixel. In certain embodiments, the offset value for a pixel can be derived to provide an improved or "best" solution for the pixel based at least partly on the choice of scale and bias functions. In certain such embodiments, the choice of scale and bias functions can be provided to give an increased ability to select offset values that work well. Thus, in certain such embodiments optimization techniques can be used to derive an efficient factorization of the calibration into global and local components. Embodiments of such techniques can be applied to dark current correction as well as to other aspects of pixel calibration such as, e.g., correcting for uniformity of performance across the range of light exposure levels.

In certain embodiments described herein, two global factors and one offset factor are utilized. However, this is not a limitation, and in other embodiments, the number of global factors and/or the number of local factors can be one, two, three, or more. Thus, in various implementations, the calibration is factored into local and global components to improve calibration performance for a given resource allocation. In various such implementations, optimization techniques can be used to obtain the factorization into local and global components. Embodiments of the systems and methods described herein can access the global and/or local factor(s) from a computer-readable memory that stores the factor(s) as data structures (e.g., LUTs, databases, etc.), mathematical functions (e.g., splines, polynomials, etc.), and so forth.

Example Calibration System

Figure 12:
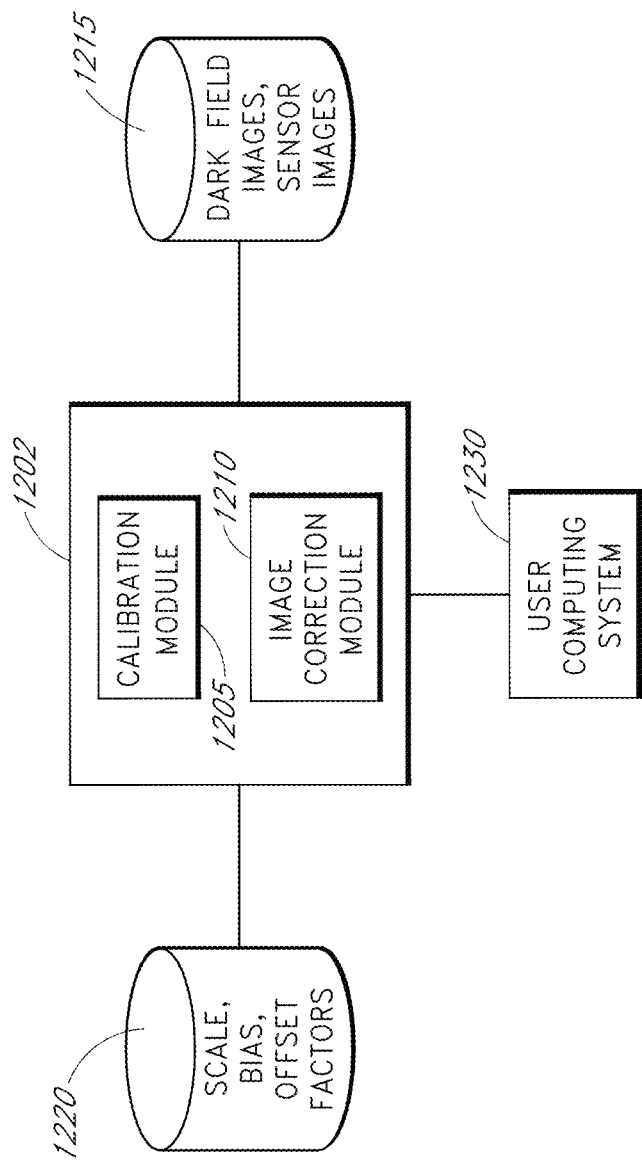
FIG. 12 is a block diagram that schematically illustrates an implementation of a system for calibrating photosensors and correcting images for dark current.

FIG. 12 is a block diagram that schematically illustrates an example implementation of a system 1200 for calibrating sensors and correcting images for the effects of dark current. In this system 1200, dark field images obtained from a sensor can be stored in a physical data repository 1215. A dark current analysis engine 1202 can include a calibration module 1205 for determining a calibration for the sensor that will correct for the effects of dark current. For example, the calibration module 1205 can implement the method described with reference to FIG. 2 to determine global and/or local factors (e.g., scale, bias, and offset factors) that correct for dark current. These correction factors can be stored in a physical data repository 1220. The dark current analysis engine 1202 can also include an image correction module 1210 that accesses sensor images stored in the data repository 1215, applies the correction factors stored in the data repository 1220 to the sensor images, to determine a sensor image corrected for dark current. For example, the image correction module 1210 can implement the method described with reference to FIG. 1B. The dark current analysis engine 1202 can store the corrected sensor image in the data repository 1215. In some implementations, the engine 1202 can communicate the corrected image to a user. In some implementations, a user computing system 1230 can communicate a sensor image to the image correction module 1210, which can apply the correction factors from the data repository 1220, and return a corrected sensor image to the user computing system 1230. The dark current analysis engine 1202 can be implemented on physical computing hardware.

The system 1200 is intended to be illustrative and not limiting. In other implementations, the functionalities and/or components of the system 1200 can be arranged differently than shown in FIG. 12. For example, the repositories 1215 and 1220 can be merged together or separated into additional repositories. In other implementations, the engine 1202 may be configured so that the calibration module 1205 and the image correction module 1210 are implemented on separate computing systems. For example, sensor calibration may be performed by a first computing system and image correction may be performed by a different computing system. Many variations are possible.

CONCLUSION

Embodiments of the sensors, systems, and methods described herein can be used in any type of electronic imaging system or to process image data received from an imaging sensor. As one example, the sensors, systems, and methods can be used with a geo-imaging system in an Earth-orbiting satellite or micro-satellite. As another example, the sensors, systems, and methods can be used with cameras in cellular telephones.

Various implementations have been described in the context of a two-dimensional photosensor for purpose of illustration and without limitation. However, the teachings presented herein are not so limited and can be applied to one-dimensional photosensors (e.g., a linear array of pixels) as well as to any other type of detector in which there may be a pixel-dependent noise or bias. The foregoing teachings are also not limited to correcting only for sensor temperature and amplifier gain, and in other implementations, can be applied, for example, to detector quantum efficiency as a function of incident light wavelength, and so forth.

Each of the processes, methods, and algorithms described herein and/or depicted in the attached figures may be embodied in, and fully or partially automated by, code modules executed by one or more physical computing systems, computer processors, application-specific circuitry, and/or electronic hardware configured to execute computer instructions. For example, computing systems can include general or special purpose computers, servers, desktop computers, laptop or notebook computers or tablets, personal mobile computing devices, mobile telephones, and so forth. A code module may be compiled and linked into an executable program, installed in a dynamic link library, or may be written in an interpreted programming language.

Various embodiments have been described in terms of the functionality of such embodiments in view of the general interchangeability of hardware and software. Whether such functionality is implemented in application-specific hardware or in software executing on one or more physical computing devices depends upon the particular application and design constraints imposed on the overall system. Further, certain implementations of the functionality of the present disclosure are sufficiently mathematically, computationally, or technically complex that application-specific hardware or one or more physical computing devices (utilizing appropriate computer-executable instructions) may be necessary to perform the functionality, for example, due to the volume or complexity of the calculations involved or to provide results substantially in real-time.

Code modules may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes and process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single software product or packaged into multiple software products. Many implementation variations are possible.

The processes, methods, and systems may be implemented in a network (or distributed) computing environment. Network environments include enterprise-wide computer networks, intranets, local area networks (LAN), wide area networks (WAN), cloud computing networks, crowd-sourced computing networks, the Internet, and the World Wide Web. The network may be a wired or a wireless network (e.g., a terrestrial and/or satellite network) or any other type of communication network.

The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing description, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

What is claimed is:

1. A computer-implemented method for correcting for dark current in a photosensor comprising a plurality of pixels, the method comprising:
    under control of one or more physical computing devices configured with specific computer-executable instructions,
    accessing, by the one or more physical computing devices, a scale factor and a bias factor for the plurality of pixels of the photosensor, wherein the plurality of pixels includes all the pixels of the photosensor, the scale factor and the bias factor depending at least partly on a temperature of the photosensor and a gain of the photosensor, and the scale factor and the gain factor both contributing to any dark current in the photosensor, the scale factor having the same value for each pixel in the plurality of pixels, and the bias factor having the same value for each pixel in the plurality of pixels;
    for each pixel in the plurality of pixels of the photosensor:
        accessing, by the one or more physical computing devices, a pixel value that represents a response of the pixel to receipt of light;
        accessing, by the one or more physical computing devices, an offset value for the pixel, the offset value not dependent on the temperature or the gain of the photosensor;
        determining, by the one or more physical computing devices, a corrected pixel value that depends at least partly on the pixel value, the scale factor, the bias factor, and the offset value, wherein the scale factor and the bias factor are global factors that are the same for each pixel in the plurality of pixels, and wherein the pixel value and the offset value are local factors capable of having values that are different for different pixels in the plurality of pixels; and
        providing, by the one or more physical computing devices, the corrected pixel value.

2. The method of claim 1, wherein the photosensor comprises a total number of pixels, the plurality of pixels comprises a first number of pixels, and the total number is greater than the first number.

3. The method of claim 2, wherein at least some of the pixels of the photosensor are divided into multiple groups of pixels, with each of the multiple groups including a plurality of pixels, and the method of claim 1 is separately applied to each of the multiple groups of pixels using a respective scale factor and bias factor that applies to the group.

4. The method of claim 1, wherein determining the corrected pixel value comprises subtracting an estimate of the dark current for the pixel from the pixel value, wherein the estimate of the dark current for the pixel is the sum of (i) the scale factor multiplied by the offset value and (ii) the bias factor.

5. The method of claim 1, wherein the pixel value is a reset-corrected pixel value from the photosensor.

6. The method of claim 1, wherein providing the corrected pixel value comprises storing the corrected pixel value in nontransitory computer storage or communicating the corrected pixel value via a transmission medium.

7. The method of claim 1, wherein accessing a scale factor and a bias factor or accessing an offset value for the pixel comprises one or more of: accessing a lookup table or evaluating a mathematical function.

8. The method of claim 7, wherein the mathematical function comprises a spline function or a polynomial function.

9. A system for correcting for dark current in a sensor comprising a plurality of pixels, the system comprising:
   physical data storage configured to store:
   (i) a scale factor applicable to the plurality of pixels, wherein the plurality of pixels includes all the pixels of the photosensor,
   (ii) a bias factor applicable to the plurality of pixels, and
   (iii) an offset value for each pixel in the plurality of pixels,
   wherein the scale factor and the bias factor depend at least partly on a temperature of the sensor and a gain of the sensor, and the offset value does not depend on the temperature or the gain of the sensor, and the scale factor and the gain factor both contribute to any dark current in the photosensor; and
   a physical computer processor in communication with the physical data storage, the physical computer processor configured to:
   access the scale factor and the bias factor;
   access a pixel value representing an output of a pixel in the plurality of pixels;
   access the offset value for the pixel in the plurality of pixels; and
   determine a corrected pixel value for the pixel, wherein the corrected pixel value depends at least partly on the pixel value, the scale factor, the bias factor, and the offset value, wherein the scale factor and the bias factor are global factors that are the same for each pixel in the plurality of pixels, and wherein the pixel value and the offset value are local factors capable of having values that are different for different pixels in the plurality of pixels.

10. The system of claim 9, wherein the computer processor is configured to determine the corrected pixel value by subtracting from the pixel value (i) the scale factor multiplied by the offset value and (ii) the bias value.

11. The system of claim 9, wherein to access the scale factor, the bias factor, or the offset value, the computer process is configured to access a lookup table or evaluate a mathematical function.

12. A sensor system comprising:
   the system for correcting for dark current of claim 9; and
   the sensor.

13. The sensor system of claim 12, further comprising a temperature sensor configured to measure the temperature of the sensor.

14. An imaging system comprising the sensor system of claim 12, wherein the sensor comprises a photosensor.

15. The imaging system of claim 14, further comprising a temperature sensor configured to measure the temperature of the photosensor.

16. A computer-implemented method for estimating dark current in a sensor comprising a plurality of pixels, the method comprising:
   under control of one or more computing devices configured with specific computer-executable instructions,
   accessing, by the one or more computing devices, a dark current value for each of the plurality of pixels in the sensor;
   fitting, by the one or more computing devices, the dark current values for the plurality of pixels to a dark current model, wherein the dark current model is based at least partly on:
   a scale factor;
   a bias factor; and
   an offset,
   wherein the scale factor and the bias factor depend at least partly on a temperature of the sensor, the scale factor has a first same value for all the pixels in the plurality of pixels, the bias factor has a second same value for all the pixels in the plurality of pixels, the offset is independent of the temperature of the sensor, and the offset has values that can be different for different pixels in the plurality of pixels; and
   wherein the fitting first determines the scale factor and the bias factor, and then determines the offset value for a pixel in the plurality of pixels based at least in part on the scale factor, the bias factor, and the dark current value for the pixel; and
   providing, by the one or more computing devices the scale factor, the bias factor, and the offset.

17. The method of claim 16, wherein at least one of the scale factor or the bias factor further depends at least partly on a gain of the sensor.

18. The method of claim 16, wherein the fitting is performed by optimizing an objective function based at least partly on a sum of squared differences between the dark current value and the dark current model for each of the pixels in the plurality of pixels.

19. The method of claim 16, wherein the fitting determines the scale factor and the bias factor from fewer than all of the pixels in the sensor.

20. The method of claim 16, wherein the dark current value for each of the pixels in the plurality of pixels is an average dark current value determined at least partly from a plurality of dark frame images taken by the sensor.

21. The method of claim 16, wherein fitting comprises determining a lookup table for at least one of the scale factor, the bias factor, or the offset.

22. The method of claim 16, wherein fitting comprises determining a mathematical function that represents at least one of the scale factor, the bias factor, or the offset.

23. The method of claim 16, further comprising measuring the dark current value for each of the plurality of pixels in the sensor.

24. The method of claim 16, wherein the plurality of pixels used for the fitting does not include pixels flagged as bad pixels.

25. The method of claim 24, further comprising identifying the bad pixels by determining pixels whose dark current is above a threshold.

26. The method of claim 24, further comprising:
   excluding a first set of bad pixels for fitting the scale factor and the bias factor; and
   excluding a second set of bad pixels for fitting the offset,
   wherein the first set of bad pixels includes more bad pixels than the second set of bad pixels.

27. A system for estimating dark current in a sensor comprising a plurality of pixels, the system comprising:
   physical data storage configured to store a dark current value for each of the plurality of pixels in the sensor; and
   a physical computer processor in communication with the physical data storage, the physical computer processor configured to:
   fit the dark current values for the plurality of pixels to a dark current model, wherein the dark current model is based at least partly on a scale factor, a bias factor, and an offset, the scale factor and the bias factor depending at least partly on a temperature of the sensor, the scale factor having a first same value for all the pixels in the plurality of pixels, the bias factor having a second same value for all the pixels in the plurality of pixels, the offset independent of the temperature of the sensor, and the offset having values that can be different for different pixels in the plurality of pixels, and wherein the fitting first determines the scale factor and the bias factor, and then determines the offset value for a pixel in the plurality of pixels based at least in part on the scale factor, the bias factor, and the dark current value for the pixel; and output the dark current model to the physical data storage.

28. The system of claim 27, wherein to fit the dark current values, the computer processor is configured to determine a lookup table or a functional fit to one or more of the scale factor, the bias factor, or the offset as at least a function of the temperature of the sensor.

29. A method for determining dark current in a second sensor based at least in part on a dark current model for a first sensor that is different from the second sensor, the dark current model for the first sensor comprising a scale factor and a bias factor, the scale factor and the bias factor depending at least partly on temperature, the scale factor and the bias factor each having a respective global value for all the pixels in the first sensor, the method comprising:

accessing the scale factor and the bias factor for the first sensor;

accessing dark current values for pixels of the second sensor;

determining, by execution of instructions by a physical computer processor, offset values for each of the pixels of the second sensor, the offset values based at least in part on the dark current values for the second sensor and the scale factor and the bias factor for the first sensor; and providing a dark current model for the second sensor based at least partly on the offset values for each of the pixels of the second sensor and the scale factor and the bias factor for the first sensor.

30. The method of claim 29, wherein at least one of the scale factor and the bias factor further depends at least partly on a gain of the first sensor.

31. The method of claim 29, wherein providing a dark current model for the second sensor comprises communicating the dark current model to the second sensor.

32. The method of claim 29, further comprising measuring the dark current values for pixels of the second sensor.

* * * * *